United States Patent [19]

Balkwill

[11] 4,101,303
[45] Jul. 18, 1978

[54] PERFORATE GLASS STRUCTURES AND METHOD OF MAKING THE SAME

[75] Inventor: John Treagus Balkwill, Saugus, Calif.

[73] Assignee: International Telephone and Telegraph Corporation, Nutley, N.J.

[21] Appl. No.: 128,598

[22] Filed: Dec. 21, 1970

[51] Int. Cl.² .................. C03C 15/00; C03B 23/20
[52] U.S. Cl. .......................................... 65/31; 65/42; 65/54; 65/55; 65/56; 65/61
[58] Field of Search .......... 65/31, DIG. 7, 155, 65/42, 54, 55, 56, 61

[56] References Cited

U.S. PATENT DOCUMENTS

| | | | |
|---|---|---|---|
| 3,216,807 | 11/1965 | Woodcock | 65/DIG. 7 |
| 3,224,851 | 12/1965 | Hicks, Jr. | 65/DIG. 7 |
| 3,226,589 | 12/1965 | Woodcock | 65/DIG. 7 |
| 3,294,504 | 12/1966 | Hicks, Jr. | 65/31 X |
| 3,380,817 | 4/1968 | Gardner | 65/31 X |
| 3,502,455 | 3/1970 | Gardner | 65/DIG. 7 |
| 3,551,228 | 12/1970 | Meth | 65/DIG. 7 |
| 3,558,377 | 1/1971 | Tantillo | 65/DIG. 7 |

Primary Examiner—Richard E. Schafer
Attorney, Agent, or Firm—John T. O'Halloran

[57] ABSTRACT

A channel-type electron multiplier made in the shape of a glass wafer having holes through a central portion thereof, and an imperforate glass border fused to the periphery of the wafer, the wafer glass having a thermal coefficient of expansion less than that of the border glass. In manufacture, a brief fast cooling step aids in the production of a strong, permanent bond between wafer and border.

4 Claims, 7 Drawing Figures

PERFORATE GLASS STRUCTURES AND METHOD OF MAKING THE SAME

BACKGROUND OF THE INVENTION

This invention relates to fused glass structures, and more particularly, to a high strength glass structure which is partially perforate, and to a method of making the same.

The present invention will have many applications completely unrelated to those disclosed herein and should therefor not be limited thereto. However, the invention has been found to be especially useful in the manufacture of channel-type electron multipliers. For example, one such multiplier is disclosed in U.S. Pat. No. 3,449,582.

In the past it has been the practice to produce a channel-type electron multiplier of a glass wafer perhaps with a one inch diameter, a thickness small in comparison to its diameter, and holes extending through the wafer.

Unfortunately, the holes are etched in the wafer after its circumference is ground round. This leaves jagged edges where holes are etched that are intercepted by the circular edge. The sharp points around the etched edge cause arcing when the wafer is mounted in an image intensifier or other electron tube.

Prior art wafers have also been difficult to handle in tube fabrication because they have been extremely susceptible to damage due to the tenuous jagged edges thereof.

It is also an outstanding disadvantage of a prior art wafer that the small projections at the edge thereof can and do break off after an electron tube containing the wafer has been completely processed. Thus, the wafer often poisons an otherwise good tube. The poisoned tube is then a total loss.

Only after a substantial effort was made, was the present invention made. Efforts were made prior to this invention to surround the wafer with a glass ring having a thermal expansion coefficient about equal to that of the wafer glass. However, after etching, the fused wafer and ring must be fired in a hydrogen atmosphere. During this firing the wafer and the ring invariably separated even though the firing temperature never exceeded the annealing temperature of the wafer glass or the annealing temperature of the ring glass.

SUMMARY OF THE INVENTION

In accordance with the present invention, the above-described and other disadvantages of the prior art are overcome by using a ring glass with a temperature coefficient of thermal expansion greater than that of the wafer glass.

It is unexpected that glass of different thermal expansion coefficients would not break or separate on heating or cooling. However, the wafer and ring of the present invention do not do so during hydrogen firing.

Another outstanding feature of the invention resides in the use of a brief high cooling rate for the ring and wafer after they are fused together.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
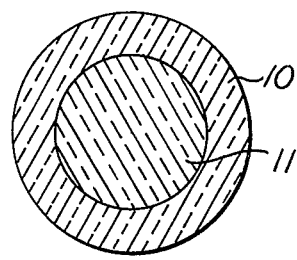
FIG. 1 is a transverse sectional view of a glass rod enclosed in a glass tube.

In the method of the present invention, a glass tube 10, as shown in FIG. 1, is located about a glass rod 11. Tube 10 and rod 11 are heated and drawn together by a conventional process which generally only reduces the diameters of tube 10 and rod 11, and not the relative sizes thereof. Tube 10 and rod 11 may be drawn to, for example, a diameter of 50 or 100 mils from an initial tube diameter of 1½ to 2½ inches.

Figure 2:
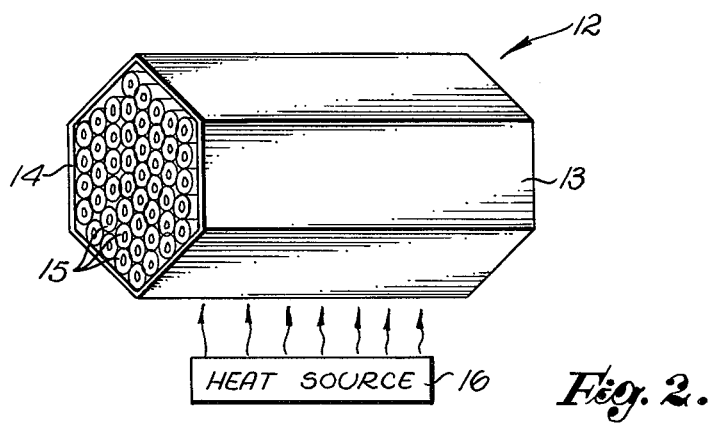
FIG. 2 is a perspective view of a hexagon mold filled with glass fibers.

The drawing of the section shown in FIG. 1 may be continuous. Once drawn, the glass fibers may be cut or broken into 12 inch lengths and packed in a graphite hexagon mold 12, as shown in FIG. 2, having upper and lower halves 13 and 14, respectively. The glass fibers are indicated at 15. Note will be taken that each of the glass fibers 15 will have a cross-sectional similar to that shown in FIG. 1 where the outside diameter of tube 10 may be, for example, 50 mils.

While in mold 12, fibers 15 are heated by apparatus 16, shown in FIG. 2, to tack the fibers 15 together. Mold halves 13 and 14 are then removed, and the entire tacked assembly of fibers 15 is, once again, drawn from a size, for example, such that the dimension of the hexagon, corner to opposite corner, is 1½ to 2½ inches.

As is conventional, when the hexagon assembly of fibers 15 is drawn down to a size such that the corner to opposite corner dimension of the hexagon is again 50 or 100 mils, the hexagon nevertheless retains its regular shape. The drawing process is accompanied by heat, as is conventional. The drawing process is, more or less, a continuous process, as before, and the small hexagon fibers are then broken or cut again, to, for example, 4 or 6 inch lengths.

Again, it is to be noted then that each hexagon has a cross-section which is a substantially solid fused glass cross-section, but at least rods 11 maintain some individual structural integrity.

Figure 3:
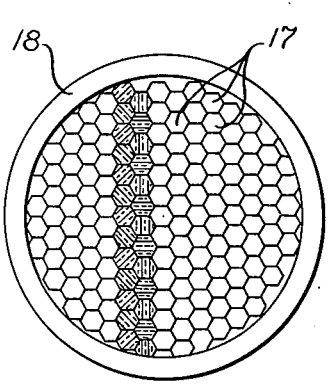
FIG. 3 is a transverse sectional view of a glass tube filled with glass fibers.
Figure 4:
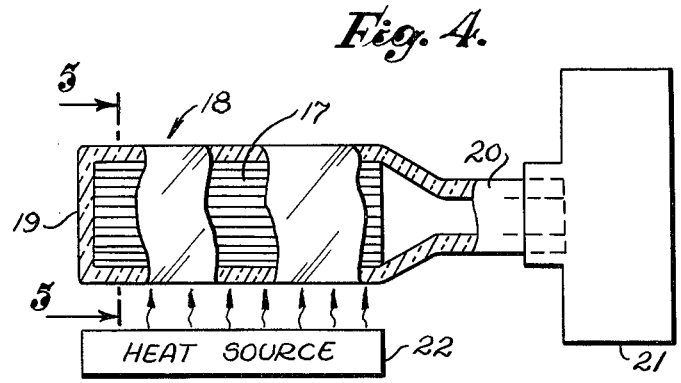
FIG. 4 is a side elevational view of apparatus, partly in section, for packing and fusing the glass fibers shown in FIG. 3 together.

After the hexagon drawing process, hexagon fibers at 17 are packed in a glass tube 18, as shown in FIGS. 3 and 4. Hexagon fibers 17 are packed in a symmetrical fashion although at or near the internal surface of tube 18, the packed hexagon fibers 17 do not have a perfectly regular circular symmetry because that is not possible.

Tube 18 may be simply a cylindrical tube having uniform and concentric internal and external cylindrical surfaces. There is no need for transverse surfaces except an end surface at one end, and a closing circular disk 19 at its other end.

In FIG. 4, the right end of tube 18, indicated at 20, has been heated and turned on a glass sealing lathe simply to make it possible to more easily attach evacuation apparatus 21 thereto.

Tube 18 is then heated by apparatus 22, or in an oven, and evacuated by apparatus 21. This causes the preponderance of pressure external to tube 18 to pack the hexagon fibers 17 together. The heat also facilitates the fusing of the hexagon fibers together as well as the fusing of the tube 18 to the external hexagon fibers.

Figure 5:
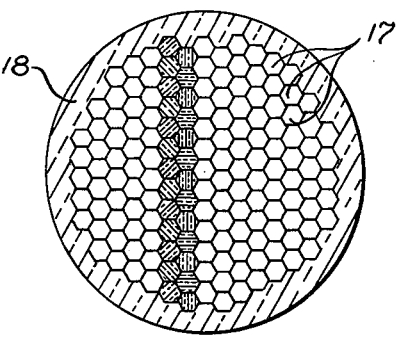
FIG. 5 is a transverse sectional view taken on the line 5-5 of a glass tube and the glass fibers therein, shown in FIG. 4.

After heating and evacuation, as illustrated in FIG. 4, tube 18 and fibers 17 will appear as shown in FIG. 5. Both tube 18 and fibers 17, shown in FIG. 5, form a unitary fused glass body known as a boule. The tube 18 has been heated sufficiently so that it has flowed into any gaps in the periphery of the fibers 17 at their external edges. However, the tube 18 does not flow a substantial distance into any space where the hexagon fibers have been packed symmetrically together and fused thereat.

Tube 18 is then ground off of the structure shown in FIG. 5. This leaves a symmetrical cylindrical body, shown in FIG. 6.

All of the steps shown and described herein in connection with FIGS. 1–6 are entirely conventional. It is conventional to cut the body of FIG. 6 perpendicular to its cylindrical axis or a few degrees therefrom into wafers for use as electron multipliers. It is also conventional to etch the glass of rods or cores 11 out of the body, shown in FIG. 6. However, this leaves jagged edges on the periphery of the body, shown in FIG. 6. The sharp points around the etched edge causes arcing when the wafer is mounted in an intensifier or other electron tube. The wafers are also difficult to handle because any slight damage to the jagged edge can cause undue breakage. Moreover, a small portion of the jagged edge may break away from a wafer after it has been mounted and completely processed in an electron tube. The tube may thus become poisoned and be a total loss.

Figure 6:
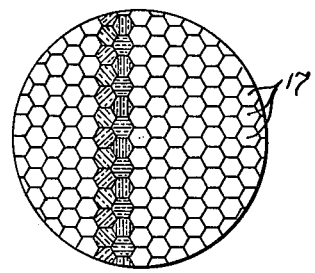
FIG. 6 is a transverse sectional view similar to FIG. 5 with the glass tube removed.
Figure 7:
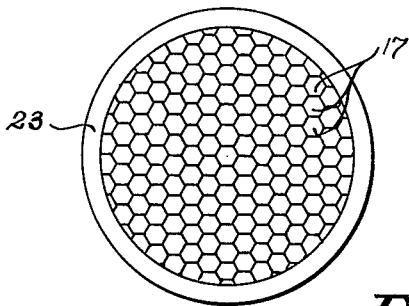
FIG. 7 is an end elevational view of the body of FIG. 6 located in a glass tube.

In accordance with the present invention, the body of FIG. 6 is located in a glass tube 23, a shown in FIG. 7, before the wafers are cut and before etching. Tube 23 and fibers 17 are then heated and tube 23 evacuated, as in FIG. 4. to form a second fused body as boule. Tube 23 and fibers 17 then look about the same as tube 18 and fibers 17 in FIG. 5, except that the border of fibers 17 is substantially a perfect circle.

Then, in accordance with the present invention, the wafers are cut before tube 23 is ground off. Further, tube 23 is never ground off, or at least not completely. Wafers are ground and polished prior to etching and $H_2$ firing. Then cores 11 are etched out, and the etched wafers are fired in a hydrogen oven at, for example, 400° C. The wafers are then ready for use in electron tubes in any types of image intensifiers and other conventional electron tubes such as, for example, that disclosed in the said patent.

Many different kinds of glasses may be employed in the manufacture of the electron multiplier of the present invention. However, some typical glasses are given in the following.

Cores 11 are preferably made of a glass which may be etched from the glass of tubes 10, and the glass of tube 23. One typical glass for cores 11 is RE 693 made by Optics Technology of Palo Alto, California. Another type of glass which may be used for cores 11 is LAK 3 made by Jenaer Glaswerk Schott & Gen., of Mainz, West Germany.

Both RE 693 and LAK 3 may be etched from the glass of tubes 10 and tube 23 by hydrochloric acid.

Tubes 10 are preferably made of glass, Type 8161, made by the Corning Glass Works. Corning 8161 has a thermal coefficient of expansion of $90 \times 10^{-7}$ inches per degree Centigrade. Tube 18 is made from Corning 0012.

Tube 23 is a Kimble glass made by the Owens Illinois Glass Company. Tube 23 is a Kimble glass Type R6. It has a thermal expansion coefficient of $93 \times 10^{-7}$ inches per degree Centigrade.

According to an outstanding feature of the present invention, tube 23 with fibers 17 inside is heated and evacuated. At this point, tube 23 is heated to a point such that tube 23 will fuse to the outer fibers 17. Tube 23 and fibers 17 are then cooled immediately 100° C. within a period from about 1 to 2 minutes. After that, tube 23 and fibers 17 are cooled at a rate of about 100° C. per hour or less.

According to the brief fast cooling feature of the invention, fibers 17 never separate from tube 23 during hydrogen firing. The same is true when tube 23 is made of glass which has a thermal expansion coefficient larger than that of the glass of tubes 10.

Note will be taken that in normal glass working processes, if two different glasses are combined, they should have the same thermal expansion coefficient. This is not true of tube 23 and tubes 10. It is thus unexpected that the higher thermal expansion coefficient of the glass of tube 23 would work with the glass of the tubes 10 which has a lower thermal expansion coefficient.

A circular mold may be substituted for mold 12. The process may otherwise be the same. Alternately, fibers 15 may be placed directly in tube 18 and the process completed as described hereinbefore.

What is claimed is:

1. A method of making a perforate glass plate comprising the steps of: heating and drawing a first glass rod and a surrounding first glass tube to a smaller diameter, said first glass tube having a given thermal expansion coefficient; cutting said drawn first rod and tube into equal lengths; packing a hexagon mold full of said rod and tube lengths with said rod and tube lengths parallel; heating said mold to tack said tubes together; heating and drawing said tacked tubes and rods to a smaller size hexagon; cutting said smaller hexagon into equal lengths; placing said hexagon lengths in parallel positions inside a second glass tube; heating and evacuating said second glass tube to force it into contact with and fuse with said hexagon lengths to make a first boule; grinding off said second tube to make said first boule have a cylindrical surface; inserting said ground first boule into a third glass tube having a larger thermal expansion coefficient than said first tube; heating said ground first boule and said third tube and evacuating said third tube to force it into contact with said ground first boule and cause said ground first boule and said third glass tube to fuse together to make a second boule; slicing said second boule in a plane transverse to its axis to produce a thin wafer; removing said rod glass from said wafer by etching to form a plurality of holes therethrough; and heating said etched wafer in a hydrogen atmosphere so that said third glass tube remains fused to said wafer.

2. The invention as defined in claim 1, wherein the glass of said first tube has a thermal expansion coefficient of about $90 \times 10^{-7}$ inch per degree Centigrade, and the glass of said third tube has a thermal expansion coefficient of about $93 \times 10^{-7}$ inch per degree Centigrade.

3. The invention as defined in claim 1, wherein said rod glass is of a type which can be etched by hydrochloric acid from said first and third tubed glasses without etching the latter.

4. The invention as defined in claim 1, wherein said second boule is cooled after the said heating thereof about 100° C. from the fusion temperature of said first and third tube glasses within a period of from about 1 to 2 minutes, and cooled to room temperature thereafter at a rate less than about 100° C. per hour.

* * * * *